United States Patent [19]

O'Neill et al.

[11] 4,390,290

[45] Jun. 28, 1983

[54] TEMPERATURE SENSOR FOR A RESISTANCE FURNACE

[75] Inventors: Michael J. O'Neill, Wilton; Harold I. Hill, Fairfield, both of Conn.

[73] Assignee: The Perkin-Elmer Corporation, Norwalk, Conn.

[21] Appl. No.: 249,534

[22] Filed: Mar. 31, 1981

[51] Int. Cl.³ .................. G01K 7/04; G01K 13/00
[52] U.S. Cl. .................. 374/142; 374/179; 373/136
[58] Field of Search ............... 73/350, 359 R, 362.5; 136/232; 373/136; 374/142, 179

[56] References Cited

U.S. PATENT DOCUMENTS 2,012,112  8/1935  States ............................. 73/359
4,018,624  4/1977  Rizzolo ........................... 136/232

Primary Examiner—James J. Gill
Attorney, Agent, or Firm—S. A. Giarratana; F. L. Masselle; R. A. Hays

[57] ABSTRACT

An apparatus for reducing the leakage current error from a resistance furnace includes a grounded electrically conductive member, an electrically insulating, thermally conductive member adjacent thereto, which thermally conductive member is contacted by a thermocouple junction.

9 Claims, 1 Drawing Figure

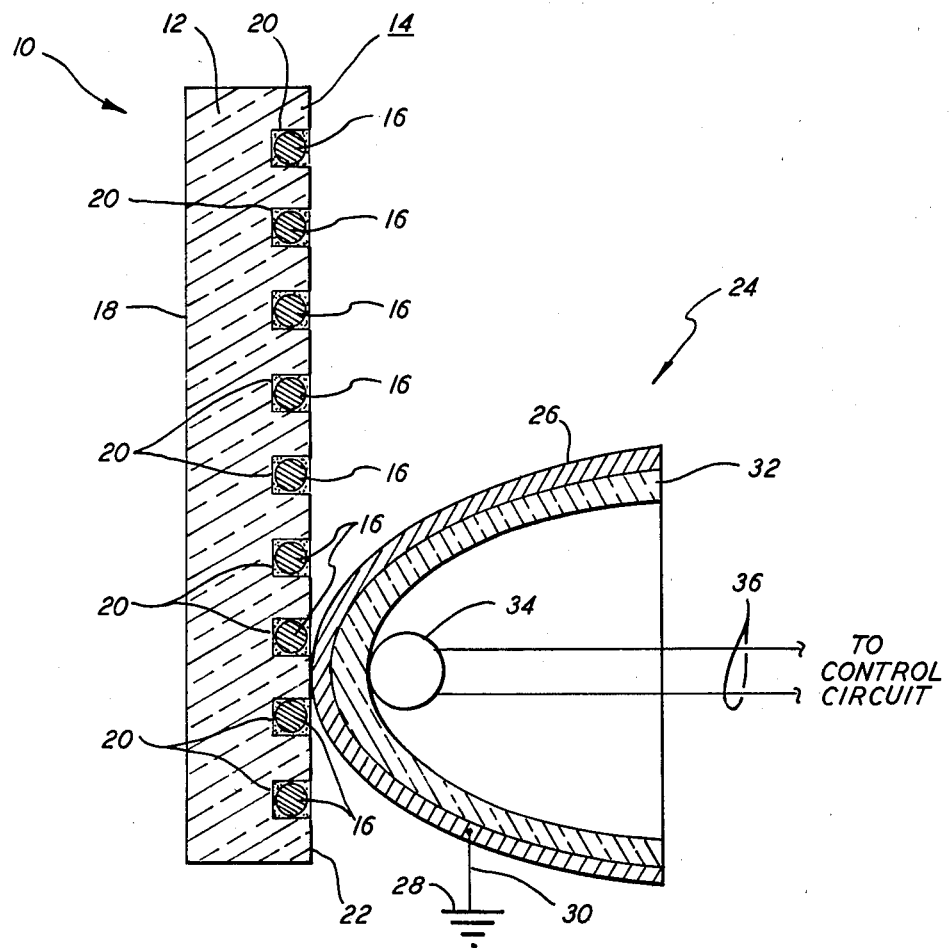

TEMPERATURE SENSOR FOR A RESISTANCE FURNACE

BACKGROUND OF THE INVENTION

The present invention generally relates to the temperature monitoring of a resistance furnace and, in particular, relates to such an apparatus which is independent of any current leakage through the walls of such a furnace.

Many modern analytical instruments utilize a resistance furnace to provide precisely controlled temperatures to elements under test. As one element of the temperature control mechanism for such a furnace, a thermocouple is generally employed in conjunction with the furnace to provide a feedback signal to maintain the furnace at a particular temperature or to control the time rate of change of temperature of the furnace. In a sensitive thermal instrument, such as a differential thermal analyzer, the effect of current leakage through the walls of the furnace into the electrical measuring circuit can create intolerable errors in the particular measurement being made.

In general, the furnace segment includes a wire coil imbedded in a ceramic material such as aluminum oxide ($Al_2O_3$). While such ceramic materials are substantially thermally inert over a wide temperature range, the electrical characteristics are such that significant leakage current can be conducted therethrough. It is a known characteristic of such materials that current leakage therethrough increases as the temperature increases so that at temperatures above 1500° C. the current leakage is unacceptably high. For example, in a ten amp, 60 Hz furnace, the current leakage can generate a spurious voltage in the thermocouple amplifier circuit. Since the accuracy requirements of the temperatures involved are quite stringent, i.e. sensitivities on the order of about 0.05° C. in differential thermal analyzers the spurious voltage caused by leakage current can produce significant errors.

One solution to this problem is to position the thermocouple a short distance, i.e. spaced apart, from the external wall of the furnace, leaving an air gap therebetween. While this ensures that no current is leaked into the measuring circuit, and hence no voltage drop created, from the furnace itself, the separation of the thermocouple from the furnace wall consequently reduces the accuracy of the thermocouple reading due to the temperature gradient created across the air gap. Another basic drawback of an air gap is that an additional transport lag is introduced into the temperature control feedback loop, thus requiring a reduction in the loop gain in order to maintain loop stability. Such a reduction in loop gain degrades the temperature control sensitivity in the circuit.

SUMMARY OF THE INVENTION

Accordingly, it is one object of the present invention to provide an apparatus for accurately measuring the temperature of a resistance furnace.

This object is accomplished, at least in part, by an apparatus including an electrically conductive member physically contacting the wall of the furnace, which member is also electrically connected to a ground. The apparatus can also include an electrically insulating member adjacent the electrically conductive member and a thermocouple junction affixed thereto.

Other objects and advantages of the invention will become apparent from the following detailed specification and appended drawing.

BRIEF DESCRIPTION OF THE DRAWING

The single FIGURE of the drawing is a partial cross-sectional view of an apparatus, not drawn to scale, embodying the principles of the present invention.

DETAILED DESCRIPTION OF THE INVENTION

A segment, generally indicated by the numeral 10 in the drawing, of a wall 12 of a resistance furnace 14 includes a plurality of electrically resistive coil members 16 therein which are spaced apart from the internal surface 18 of the furnace 14. Preferably, the furnace 14 is made from a ceramic material and the coil members 16 are embedded in grooves 20 in the exterior surface 22 of the wall 12 thereof.

An apparatus, indicated generally at 24 in the drawing and embodying the principles of the present invention, for monitoring the temperature of the furnace 14 is affixed to the external wall 22 thereof. In general, the apparatus 24 includes an electrically conductive member 26 adjacent the wall 12, an electrically insulating member 32 adjacent the electrically conductive member 26 and spaced apart from the wall 12 thereby and a thermocouple junction 34 affixed to the electrically insulating member 32.

In the preferred embodiment, the electrically conductive member 26 is fabricated from platinum or a platinum alloy. These materials are selected to ensure that the member 26 has relatively stable characteristics at the high temperatures, on the order of about 1500° C., reached by the furnace 14. In addition, either platinum or a platinum-rhodium alloy, for example, is an excellent thermal conductor. The member 26 is about 130 micrometers thick and can be formed in the shape of a dome having a maximum diameter of about 0.5 centimeter. The member 26 can be affixed to the external wall 18 of the furnace 14 by means of, for example, a stainless steel spring clip (not shown) or by other like attachment techniques known in the art.

An electrically conductive ground strap 30 provides an electrically conductive path between the member 26 and a system ground 28. The strap 30 thus conducts leakage current from the wall 14 to ground 28 via the member 26. Preferably, the strap 30 is also formed of platinum or the like, and can be directly resistance welded to the member 26.

The electrically insulating member 32 is adjacent the member 26 and preferably is formed from a thermally conductive ceramic, e.g. alumina, for high temperature stabilization. In the present embodiment, the electrically insulating member 32 is spaced apart from the wall 12 by the member 26. In a practical embodiment, the electrically insulating member 32 is about 0.5 millimeter thick and shaped so as to snugly fit within the dome-shaped electrically conductive member 26.

A thermocouple junction 34 having leads 36 extending therefrom is in direct thermal contact with the inner cone 32, preferably at the point thereof closest to wall 18. The leads 36 of the thermocouple 34 can be connected to a peripheral circuitry for monitoring and controlling the electrical signals, and hence the temperature, of the system.

Operationally, the platinum member 26, while an excellent thermal conductor as well as an excellent electrical conductor, drains any leakage current flowing within the wall 12 of the furnace 14 to the ground 28 of the system but does not sustain any significant thermal gradient thereacross. Likewise, the 0.5 millimeter thick alumina member 32 is sufficiently thin as to inhibit any significant thermal gradient from being set up thereacross. Further, since the apparatus 24 is stable, particularly with respect to its material characteristic, over wide ranges of temperature, any temperature gradient set up thereacross, i.e. between the wall 12 and the thermocouple junction 34, is readily determined and easily compensated for, by well known techniques, in the electrical portion of the system.

While the description herein has been directed to a specific embodiment, it is not to be considered limiting since other arrangements will become apparent to one skilled in the art. The scope and spirit of the present invention, therefore, is to be considered limited only by the appended claims and the reasonable interpretation thereof.

What is claimed is:

1. An apparatus, in combination with a resistance furnace, comprising:
    an electrically conductive member physically contacting an external wall of said furnace, said member being connected to a system ground potential via an electrically conductive ground strap;
    an electrically insulating member adjacent said electrically conductive member and spaced apart from said external wall thereby; and
    a thermocouple affixed to said electrically insulating member.

2. Apparatus as claimed in claim 1 wherein:
said electrically conductive member is stable at temperatures greater than 1500° C.

3. Apparatus as claimed in claim 2 wherein:
said electrically conductive member contains platinum or a platinum alloy.

4. Apparatus as claimed in claim 3 wherein:
said thermally conductive member is formed from an electrically insulating ceramic.

5. Apparatus as claimed in claim 1 wherein:
said electrically conductive member is in the shape of a spherical dome.

6. Apparatus as claimed in claim 5 wherein:
said dome of said electrically conductive member has a diameter of about 0.5 centimeter and a wall thickness on the order of about 130 micrometers.

7. Apparatus as claimed in claim 5 or 6 wherein:
said thermally conductive member is dome-shaped and snugly fits within said electrically conductive member.

8. Apparatus as claimed in claim 7 wherein:
said thermally conductive dome has a wall thickness on the order of about 0.5 millimeter.

9. Apparatus as claimed in claim 8 wherein:
said thermocouple junction is affixed to said thermally conductive dome at its most proximate point to said wall of said furnace.

* * * * *